(12) United States Patent
Yachin et al.

(10) Patent No.: US 11,587,059 B1
(45) Date of Patent: Feb. 21, 2023

(54) SYSTEM AND METHOD FOR INSTANT PURCHASE TRANSACTIONS VIA IMAGE RECOGNITION

(71) Applicant: Slyce Canada Inc., New Waterford (CA)

(72) Inventors: Avital Yachin, Bet Lehem Haglilit (IL); Andrey Petrenko, Hadera (IL)

(73) Assignee: Slyce Canada Inc., New Waterford (CA)

( * ) Notice: Subject to any disclaimer, the term of this patent is extended or adjusted under 35 U.S.C. 154(b) by 820 days.

(21) Appl. No.: 16/453,778

(22) Filed: Jun. 26, 2019

Related U.S. Application Data

(63) Continuation of application No. 15/076,308, filed on Mar. 21, 2016, now Pat. No. 10,387,866.

(60) Provisional application No. 62/136,172, filed on Mar. 20, 2015, provisional application No. 62/136,205, filed on Mar. 20, 2015.

(51) Int. Cl.
*G06Q 30/00* (2012.01)
*G06Q 20/32* (2012.01)
*G06Q 30/0601* (2023.01)

(52) U.S. Cl.
CPC ..... *G06Q 20/3223* (2013.01); *G06Q 30/0603* (2013.01); *G06Q 30/0633* (2013.01); *G06Q 30/0641* (2013.01)

(58) Field of Classification Search
CPC .......... G06Q 30/0601; G06Q 30/0613; G06Q 30/0623; G06Q 30/0629; G06Q 30/0631
See application file for complete search history.

(56) References Cited

U.S. PATENT DOCUMENTS

| | | |
|---|---|---|
| 5,751,286 A | 5/1998 | Barber et al. |
| 5,893,095 A | 4/1999 | Jain et al. |
| 6,421,463 B1 | 7/2002 | Poggio et al. |
| 6,727,925 B1 | 4/2004 | Bourdelais |

(Continued)

OTHER PUBLICATIONS

Tsai, Sam S., et al. "Mobile product recognition." Proceedings of the 18th ACM international conference on Multimedia. 2010. (Year: 2010).*

(Continued)

*Primary Examiner* — Christopher B Seibert
(74) *Attorney, Agent, or Firm* — Innovators Legal

(57) ABSTRACT

A system and related method for completing online transactions via mobile device includes a client-side e-commerce platform executing on the mobile device that identifies candidate items for purchase based on images related to an item desired by the user. The client-side platform determines attributes of the item based on an image captured by an onboard camera or otherwise stored on, or downloaded to, the mobile device. Purchase information for items offered by participating vendors, or third-party vendors, is retrieved by the platform via APIs of the vendor network or automated middleware respectively. The user may select items for purchase and complete the transaction via single click, and the middleware forwards payment details to the third-party vendors and retrieves purchase information and transaction records from the third-party vendors. The client-side platform generates a single transaction and invoice whether the selected items are purchased from in-network or third-party vendors.

19 Claims, 5 Drawing Sheets

(56) References Cited

U.S. PATENT DOCUMENTS

| | | | |
|---|---|---|---|
| 7,987,188 B2* | 7/2011 | Neylon | G06F 16/313 706/45 |
| 8,386,336 B1* | 2/2013 | Fox | G06Q 30/0631 705/26.7 |
| 8,417,713 B1* | 4/2013 | Blair-Goldensohn | G06F 16/24578 705/347 |
| 8,688,514 B1 | 4/2014 | Sarkar et al. | |
| 9,524,518 B1* | 12/2016 | Singer | G06V 30/268 |
| 2001/0021914 A1* | 9/2001 | Jacobi | G06Q 30/0601 705/26.1 |
| 2002/0052806 A1 | 5/2002 | Hodson et al. | |
| 2002/0107718 A1 | 8/2002 | Morrill et al. | |
| 2002/0131641 A1 | 9/2002 | Luo et al. | |
| 2005/0162670 A1* | 7/2005 | Shuler, Jr. | H04N 1/00408 358/1.2 |
| 2006/0167757 A1 | 7/2006 | Holden et al. | |
| 2007/0046675 A1* | 3/2007 | Iguchi | G06T 11/206 345/441 |
| 2009/0110089 A1* | 4/2009 | Green | H04L 5/0037 370/329 |
| 2009/0125371 A1* | 5/2009 | Neylon | G06F 16/313 707/739 |
| 2010/0268661 A1* | 10/2010 | Levy | G06Q 30/02 705/347 |
| 2013/0132236 A1 | 5/2013 | Gokturk et al. | |
| 2014/0195931 A1* | 7/2014 | Kwon | G06Q 30/02 715/753 |
| 2014/0351079 A1* | 11/2014 | Dong | G06Q 30/0282 705/26.7 |
| 2015/0277681 A1 | 10/2015 | Isaacson et al. | |
| 2015/0379732 A1* | 12/2015 | Sayre, III | G06T 11/001 382/164 |
| 2017/0193997 A1* | 7/2017 | Chen | G10L 15/1815 |

OTHER PUBLICATIONS

Cremaschi, Marco, and Flavio De Paoli. "Toward automatic semantic API descriptions to support services composition." European Conference on Service-Oriented and Cloud Computing. Springer, Cham, 2017. (Year: 2017).*

Flickner et al., "Query by Image and Video Content: The QBIC System," IEEE Sep. 1995 (10 pages).

Ashley et al., "The Query by Image Content (QBIC) System," IBM Almaden Research Center, SIGMOD 1995 San Jose, USA (1 page).

Marques et al., "Content-Based Image and Video Retrieval," 2002, Springer Science+Business Media New York, USA (189 pages).

"RS/6000 SP" IBM Archives https://ibm.com/ibm/history/exhibits/vintage/vintage_4506V1002 . . . (1 page).

Barber et al, "The QBIC Project: Querying Images by Content, Using Color, Texture, and Shape," Conference Paper in Proceedings of SPIE—The International Society for Optical Engineering—https://www.researchgate.net/publication/220979865 Jan. 1993 (16 pages).

"Final Claim Constructions of the Court" *Slyce Acquisition Inc.* v. *Syte-Visual Conception Ltd. and Kohl's Corporation*—Civil Action No. 6:19-CV-257-ADA—in the United States District Court for the Western District of Texas Waco Division—May 8, 2020 (7 pages).

* cited by examiner

SYSTEM AND METHOD FOR INSTANT PURCHASE TRANSACTIONS VIA IMAGE RECOGNITION

CROSS-REFERENCE TO RELATED APPLICATIONS

The present patent application is a continuation of U.S. patent application Ser. No. 15/076,308, filed 21 Mar. 2016, which claims the benefit of U.S. Provisional Patent Applications 62/136,172, filed 20 Mar. 2015, and 62/136,205, filed 20 Mar. 2015. The entire content of each aforementioned patent filing is hereby incorporated by reference.

BACKGROUND

Current systems for web-based purchasing or mobile purchasing (e.g., via an internet-enabled smartphone or similar mobile device) incorporate an Application Programming Interface (API) to manage the exchange of information between a broad variety of client-side and merchant-side systems. APIs may be created by the parties involved in the transactions, and may to some extent be standardized, as within a network of participating vendors affiliated with each other and with a client-side platform. If, for example, the end user of a mobile device wishes to purchase multiple items from multiple third-party vendors outside a vendor network, the simultaneous invocation of multiple diverse APIs by a mobile application may slow or disrupt other activity on the mobile device. It may therefore be desirable for a mobile purchase system to simultaneously manage multiple purchases, from participating and third-party vendors, in real time without disrupting the experience of the end user. It may additionally be desirable for a mobile purchasing system to allow an end user to identify and purchase a desired item or product via visual recognition of the item, even if the end user has no prior knowledge of a nearby retailer who may stock the item or even of the manufacturer of the item.

SUMMARY

In a first aspect, embodiments of the inventive concepts disclosed herein are directed to a system for purchasing items identified via image recognition from multiple vendors via a smartphone or similar mobile device. The system may include a mobile device utilized by an end user, e.g., a prospective customer wishing to locate and purchase one or more desired items. The mobile device may include processors, a touch-sensitive display screen, and a memory for securely storing the end user's payment information. The system may include a client-side e-commerce platform executing on the mobile device, the client-side platform associated with a network of one or more affiliated vendors. The client-side platform may acquire images corresponding to the desired items via the camera of the mobile device, or from the library of images stored to the memory of the mobile device. The client-side platform may identify attributes of the desired items based on the images, generating ordered sets of candidate items based on the similarity of the candidate items to the attributes of the desired items. The system may allow the end user to select, via the client-side platform, candidate items for purchase, whether the candidate items are offered by affiliated vendors or by third-party vendors not affiliated with a vendor network. The client-side platform may retrieve pricing, inventory, and other purchase information from affiliated vendors by calling Application Programming Interfaces (APIs) of the affiliated vendors or vendor networks; purchase information may be retrieved from third-party vendors by automated middleware platforms called by the client-side platform to connect with platforms of the third-party vendors. The client-side platform may generate transactions based on the selected items based on the retrieved purchase information and end-user payment details stored in memory. When the end user completes the transaction (e.g., via single-click checkout or security challenge), the client-side platform may provide the end-user payment details to affiliated vendors (so that the affiliated vendors may execute the transaction) via the network APIs. The client-side platform may provide end-user payment details to the platforms of third-party vendors via the middleware platforms. When the purchase is confirmed, the client-side platform may retrieve transaction records from the affiliated vendors via the network APIs; the client-side platform may retrieve transaction records from the platforms of third-party vendors via the middleware platforms. The client-side platform may generate an invoice for each completed and executed transaction involving one or more purchased items, based on the transaction records retrieved from the affiliated and third-party vendors.

In a further aspect, embodiments of the inventive concepts disclosed herein are directed to a method for purchasing items identified via image recognition from multiple vendors via a smartphone or similar mobile device. The method may include acquiring images portraying products desired by an end user via a client-side e-commerce platform executing on the end user's mobile device, which includes a memory for securely storing payment details provided by the end user; the client-side platform may be associated with a vendor network of affiliated or participating vendors. The method may include identifying one or more attributes of the desired items based on the acquired images. The method may include identifying, and generating an ordered or ranked set of, candidate items based on their similarity to the determined product attributes. The method may include selecting from the identified candidate items sale items the end user wishes to purchase from either the affiliated vendors or from third-party vendors unaffiliated with the vendor network. The method may include determining prices, sizes, quantities, and other purchase details associated with the purchase of the selected sale items. The method may include generating a transaction for the purchase of the selected sale items, based on the determined purchase details and the end user's payment details. The method may include providing the end user's payment details to the affiliated vendors and third-party vendors for execution of the completed transaction. The method may include retrieving authorization codes and purchase confirmations from the affiliated vendors and third-party vendors, and generating an invoice of the completed and executed transaction for the end user.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE FIGURES

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
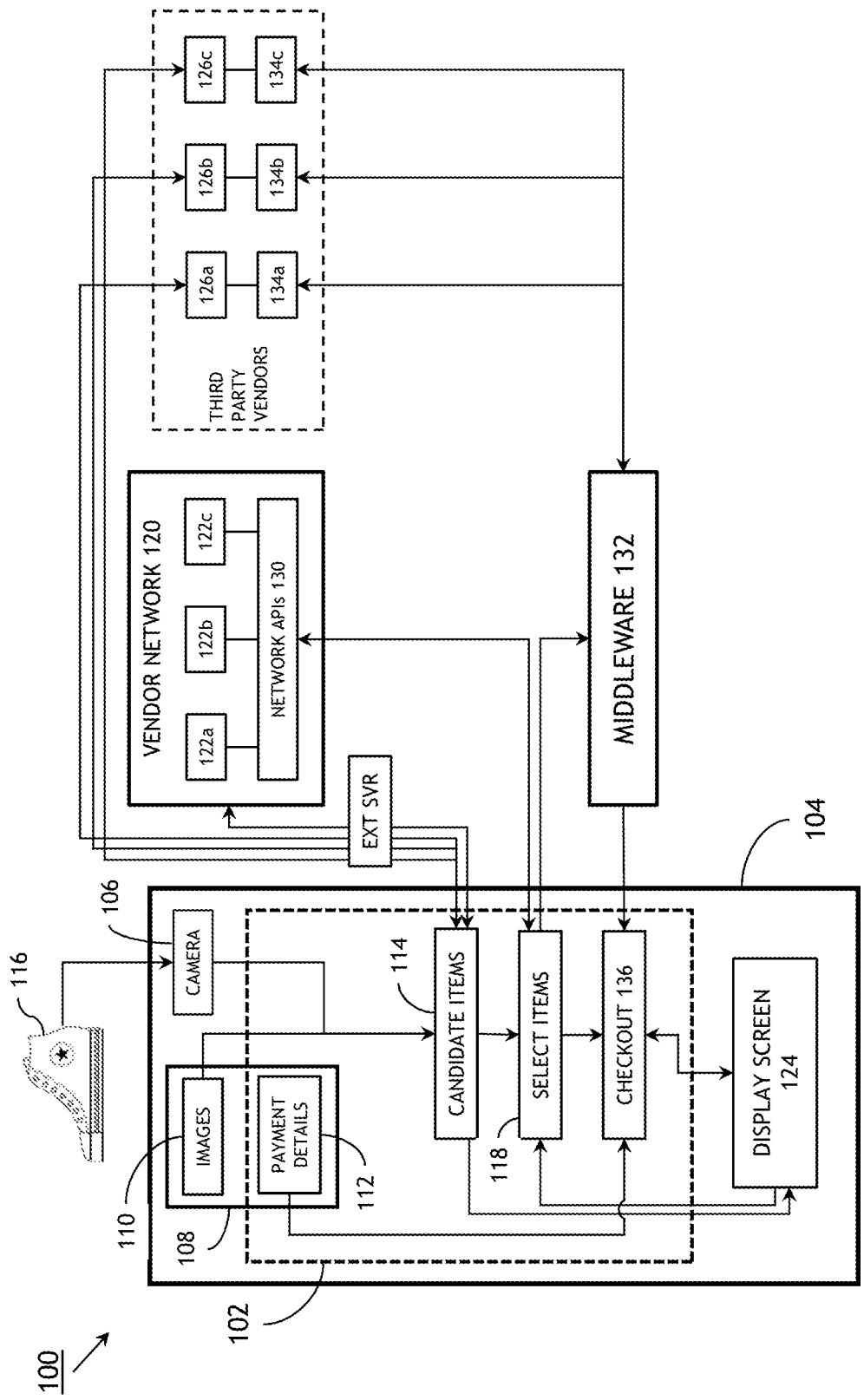
FIG. 1 is a schematic diagram of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related method for managing and completing instant online transactions via a smartphone or similar mobile device. The transactions may involve the concurrent purchase of items from in-network, or affiliated, vendors as well as from third-party unaffiliated vendors. The user provides the system with an image of a desired item; based on attributes of the image, the system returns candidate items approximating the desired item. From the perspective of the mobile end user, the candidate items are presented in a consistent and uniform fashion, and may be purchased via single-click checkout without disrupting the end user's utilization of the mobile device regardless of the offering vendor (i.e., in-network or third-party). Upon checkout, the user may receive a single invoice for a single transaction incorporating multiple purchases from multiple vendors.

Referring to FIG. 1, a system 100 for completing instant online transactions may include a client-side e-commerce platform 102 configured to execute on one or more processors of a smartphone or similar mobile device 104. The mobile device 104 may include an onboard camera 106 and memory 108 which the client-side platform 102 may access and control, e.g., the end user may capture images via the onboard camera 106 from within the client-side platform 102. The memory 108 may store images 110 previously captured by the onboard camera 106 or otherwise stored to the mobile device 102 (e.g., downloaded by the end user) as well as payment details 112 entered by the end user via an initialization process when the client-side platform 102 is installed on the mobile device 104. For example, the client-side platform 102 may ask the end user for his/her name, shipping address, credit/debit card information, bank/payment service account information, and any other relevant information necessary for the client-side platform 102 to complete a transaction, securely storing the information to the memory 108. Payment details 112 stored in the memory 108 may include security details for verifying the identity of the end user, or if additional measures of security are desired. For example, the end user may store a password, pass phrase, personal identification number (PIN), or encryption key to memory 108. A security detail stored in the memory 108 may incorporate biometric data, such as a recorded fingerprint, eyeprint, or retinal scan.

Figure 2A:
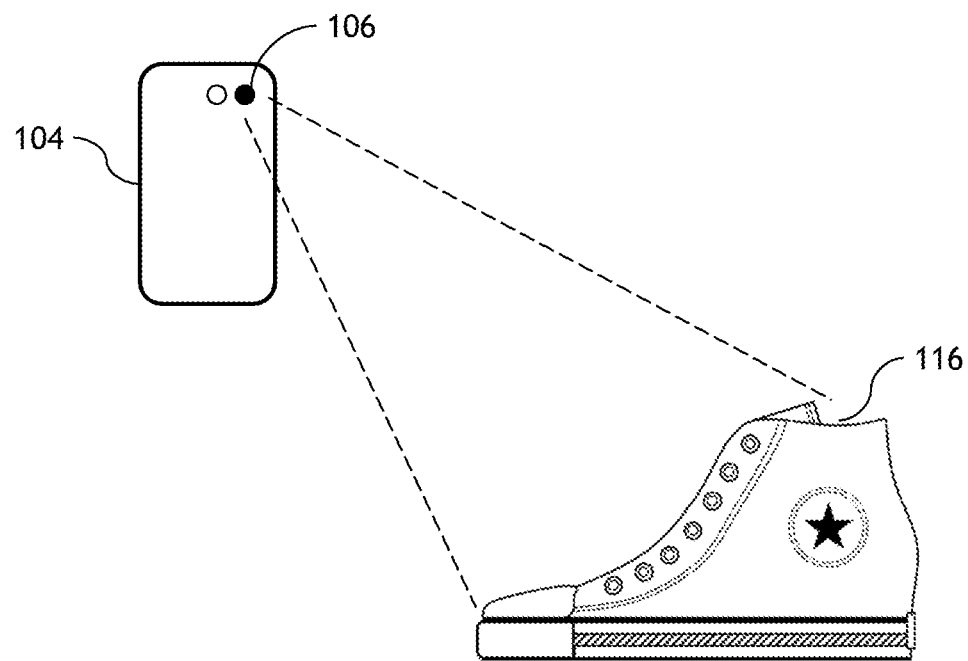
FIGS. 2A-2D illustrate operations of the system of FIG. 1 according to the inventive concepts disclosed herein.

The end user may activate the client-side platform 102 via the mobile device 104 when the end user wishes to purchase one or more desired items 116, e.g., articles of clothing or other consumer goods, such as a pair of white leather Converse high-top basketball shoes. The client-side platform 102 may search product catalogues and other online sources to identify candidate items (114) based on images captured by, or selected by the end user via the client-side platform. For example, referring also to FIGS. 2A and 2B, the end user may photograph the desired item 116 through the client-side platform 102, which accesses the onboard camera 106 to capture the image 138. The end user may photograph a circular, advertisement, magazine, or other prefabricated image portraying the desired item 116. The end user may also select, via the client-side platform 102, a previously captured or downloaded image 138 from a photo library and stored to the memory 108 of the mobile device 104. Based on an analysis of the captured image, the client-side platform 102 may determine attributes 140 of the desired item (e.g., attributes of an item of clothing may include color, material, gender, and other item categorizations such as shoes, belts, jackets, etc.). For example, the client-side platform may determine that the captured image 138 depicts a "white Converse hightop leather shoe". The quality of an image 138 submitted to the client-side platform 102*a* may determine the accuracy of the attributes 140 based on the image. For example, if a high quality image 138 is captured by the onboard camera 106, the client-side platform may determine with sufficient confidence that the desired item 116 is a 1) hightop basketball shoe; 2) a Converse-branded basketball shoe (or perhaps an even more specific make of shoe, e.g., Converse Chuck Taylor); 3) a white shoe, as opposed to gray, beige, or some other color; 4) a leather shoe, as opposed to a canvas shoe; and 5) a men's shoe, as opposed to a women's or unisex shoe. If the submitted image is of lower quality, e.g., a monochrome image or a low-resolution image, fewer attributes 140 may be determined with confidence; the client-side platform 102 may determine only that the desired item is a "white hightop shoe". The client-side platform 102 may reference knowledge bases stored on external servers or human assistance in identifying item attributes 140 from an image 138. The client-side platform 102 may determine image attributes 140 based on analysis of the image 138, e.g., colors, tints, hues, saturation and brightness levels, or pixel patterns, and identify candidate items 116 by attempting to identify catalogued or online images with similar properties to the captured image 138.

Figure 2B:
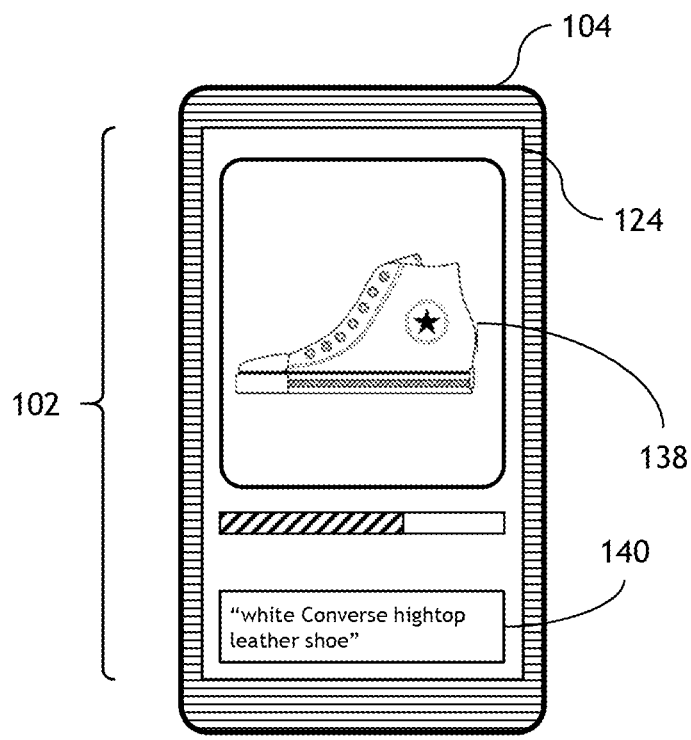

Once item attributes 140 based on a captured image 138 have been identified, the client-side platform 102 may search for candidate items 114 matching the determined item attributes 140 through a variety of online catalogues or product indices. If the client-side platform 102 is affiliated with a vendor network 120 of participating vendors 122*a-c*, the client-side platform may search catalogues organized by the vendor network 120 or by individual in-network vendors 122*a-c*. The client-side platform 102 may provide single-click access (e.g., through tapping a touch-sensitive display screen 124 of the mobile device 104) to additional product offers, coupons, or sales associated with the vendor network 120 or with individual in-network vendors 122*a-c*. The client-side platform 102 may order and display identified candidate items 114 based on the relevance or similarity of a candidate item to the desired item 116 or to the corresponding attributes 140 of the desired item. For example, referring particularly to FIG. 2C, the client-side platform 102 may return twenty-four candidate items 114 corresponding to the determined attributes 140 as shown in FIG. 2B ("white Converse hightop leather shoe") and display the candidate items on the display screen 124 of the mobile device 104. A candidate item 114*a* may be prominently displayed if the attributes of the candidate item match the attributes 140 of the desired item 116 exactly or nearly exactly. For example, the candidate item 114*a* may be a pair of white leather Converse hightop shoes and thus match exactly the desired attributes 140. The client-side platform 102 may retrieve and display catalogued information such as the price 142 of the candidate item 114*a* or the vendor 122 offering the candidate item (here, vendor XYZ is an in-network vendor 122 affiliated with a vendor network (120, FIG. 1) with which the client-side platform 102 is affiliated). A second candidate item 114*b*, also offered by the vendor XYZ (122), may be prominently displayed by the client-side platform 102 although the candidate item 114*b* may not as closely match the desired attributes 140 (e.g., candidate item 114*b* may be a pair of black canvas Converse hightop shoes). Similarly, candidate items 114*c* (a pair of white canvas lowtop shoes which may or may not be Converse-branded) and 114*d* (a pair of white leather Nike hightop shoes) may be less prominently displayed. The less relevant candidate items 114*c* and 114*d* may be offered by a third-party vendor ABC (126), which is not affiliated with the vendor network 120.

Figure 2D:
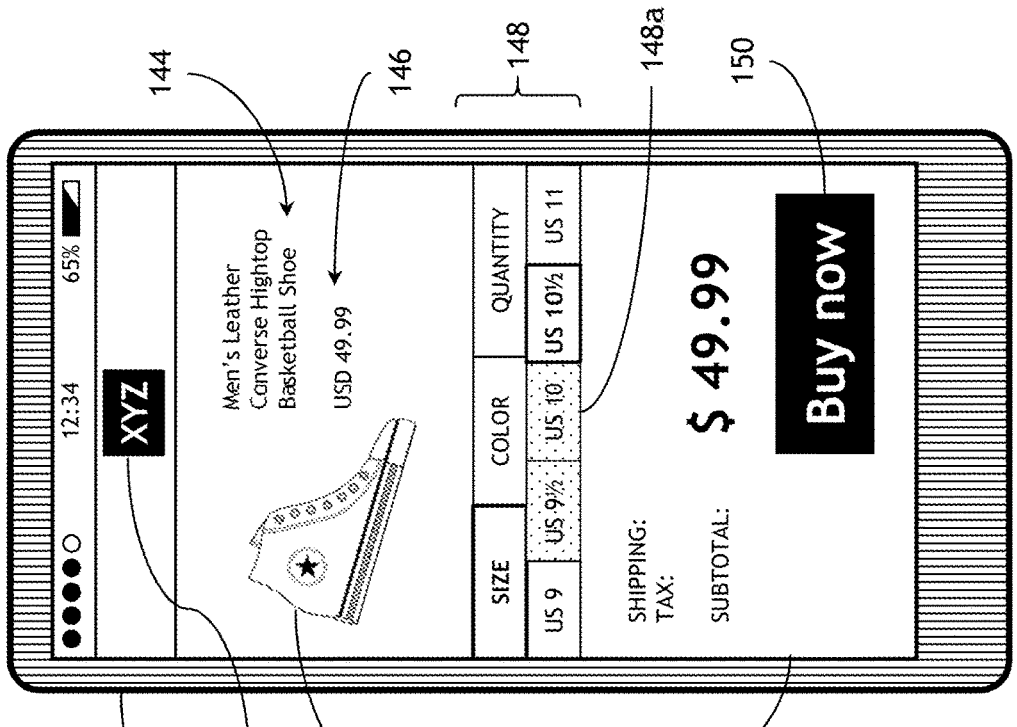
Figure 2C:
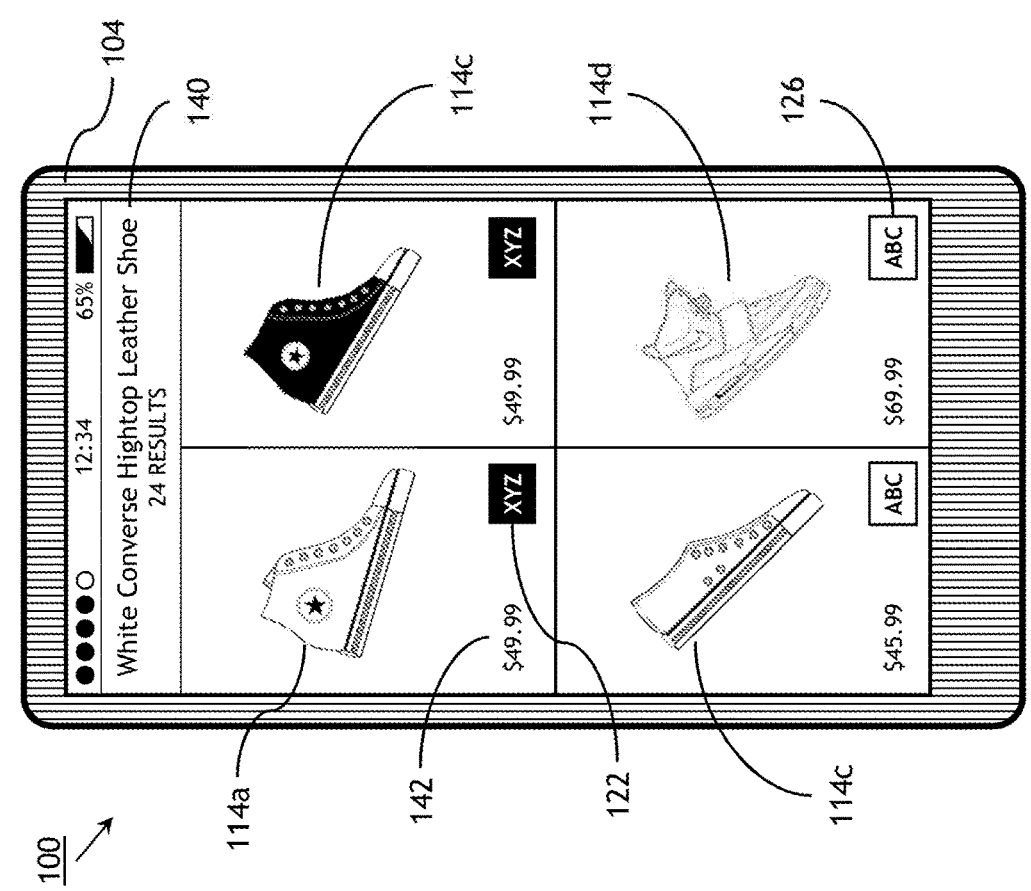

Referring also to FIG. 2D, the user may select one or more displayed candidate items 114*a-d* for purchase. For example, the user may click, tap, or otherwise contact the portion of the display screen 124 corresponding to the candidate item 114*a*, selecting that candidate item for purchase. If the selected item 118 is offered by an in-network vendor 122 (in this case, the in-network vendor XYZ), the client-side platform 102 may call network APIs 130 (FIG. 1) provided by the in-network vendor 122 (or by the vendor network 120 with which XYZ is affiliated) to retrieve current pricing and inventory information such as the item description 144 of the selected item 118 as well as the current price 146. The client-side platform 102 may call network APIs 130 to retrieve any shipping details or tax rates applicable to the purchase of the selected item 118, and allow the end user to select a desired size, color, quantity or other classification of the selected item 118 based on available inventory 148 determined by the network APIs 130 (e.g., one pair, US size 10½). The available inventory section 148 may indicate (148*a*) whether particular sizes, styles, or colors of a selected item 118 are out of stock or otherwise unavailable, e.g., US sizes 9½ and 10). Once the end user has finalized inventory details associated with the purchase of a selected item 118, the end user may add the selected item 118 to a transaction generated by the client-side platform 102, e.g., by clicking or tapping on a designated portion 150 (e.g., a button marked "buy now") of the display screen 124 of the mobile device 104. The end user may complete a generated transaction for the purchase of multiple selected items 118 via single-click checkout (136) or security challenge, depending on the desired level of security. For example, the client-side platform 102 may display a list of selected items 118 added to the transaction along with the price 146 of each item (including any applicable taxes and shipping costs); the end user may continue shopping, remove a selected item 118 from the transaction, or complete the transaction, purchasing the group of selected items 118, by tapping or clicking a designated "checkout" section of the display screen 124. The client-side platform 102 may (e.g., if the end user has previously requested such measures) require the end user to verify a security detail (securely stored with the end user's payment details 112 in the memory 108 of the mobile device 104) before completing a transaction. For example, the end user may be required to enter, confirm, or verify a password, pass phrase, PIN, encryption key, or a biometric detail such as a fingerprint or eyeprint.

Referring back to FIG. 1, once the end user has selected a pool of selected items 118 for purchase and checked out of the transaction, the client-side platform 102 may retrieve any information necessary for the purchase of each selected item 118. In the case of items to be purchased from in-network vendors 122*a-c*, the client-side platform 102 may call the network APIs 130, providing any required payment details 112 to the in-network vendors 112*a-c* so that the purchase of each individual selected item 118 of a transaction may be completed on the merchant side by the APIs. The client-side platform 102 may retrieve from the APIs 130 any shipping arrangements, applicable taxes, item availability details (e.g., in-stock colors, sizes, etc.) relevant to the purchase of selected items 118 from the in-network vendors 122a-c. With respect to selected items 118 offered by third-party vendors 126a-c, the client-side platform 102 may invoke an automated middleware platform 132 to connect the client-side platform to merchant-side e-commerce platforms 134a-c of the third-party vendors 126a-c. The middleware platform 132 may retrieve any current pricing, availability, shipping, and other purchase information necessary to finalize the purchase of selected items 118 from the third-party vendors 126a-c, providing the retrieved purchase information to the client-side platform 102.

When any necessary purchase information has been retrieved, the client-side platform 102 may prompt the end user to complete the transaction (i.e., checkout) by displaying to the end user a generated transaction (136) for the purchase of all available selected items 118, which transaction the end user may complete via interaction with the display screen 124 of the mobile device 104. For example, the client-side platform 102 may display a generated transaction 136 listing all selected items 118 to be purchased, the specific vendors from which each item will be purchased (including in-network vendors 122a-c and third-party vendors 126a-c), and the accurate and current sale price for each selected item 118; the end user may complete the transaction by clicking or tapping a specific portion of the screen, e.g., a prominently marked "buy now" button. When the end user completes the transaction, the client-side platform 102 may provide the relevant in-network vendors 122a-c with the end user's payment details 112, and retrieve any authorization codes, payment confirmations, or other records of the transaction, from the in-network vendors 122a-c via the network APIs 130. Similarly, the middleware platform 132 may retrieve user payment details 112 from the client-side platform 102 and forward any required payment details to the merchant-side platforms 134a-c of the relevant third-party vendors 126a-c so that any transactions for purchase of selected items 118 from the third-party vendors may be completed by the third party vendors. The middleware platform 132 may retrieve any resulting authorization codes, payment confirmations, tracking numbers, or other transaction records from the relevant merchant-side platforms 134a-c and forward the retrieved information to the client-side platform 102. The client-side platform 102 may generate for the end user an invoice of the transaction, which may be displayed via the display screen 124 of the mobile device 104; the generated invoice may include the retrieved authorization codes and other transaction records.

Figure 3A:
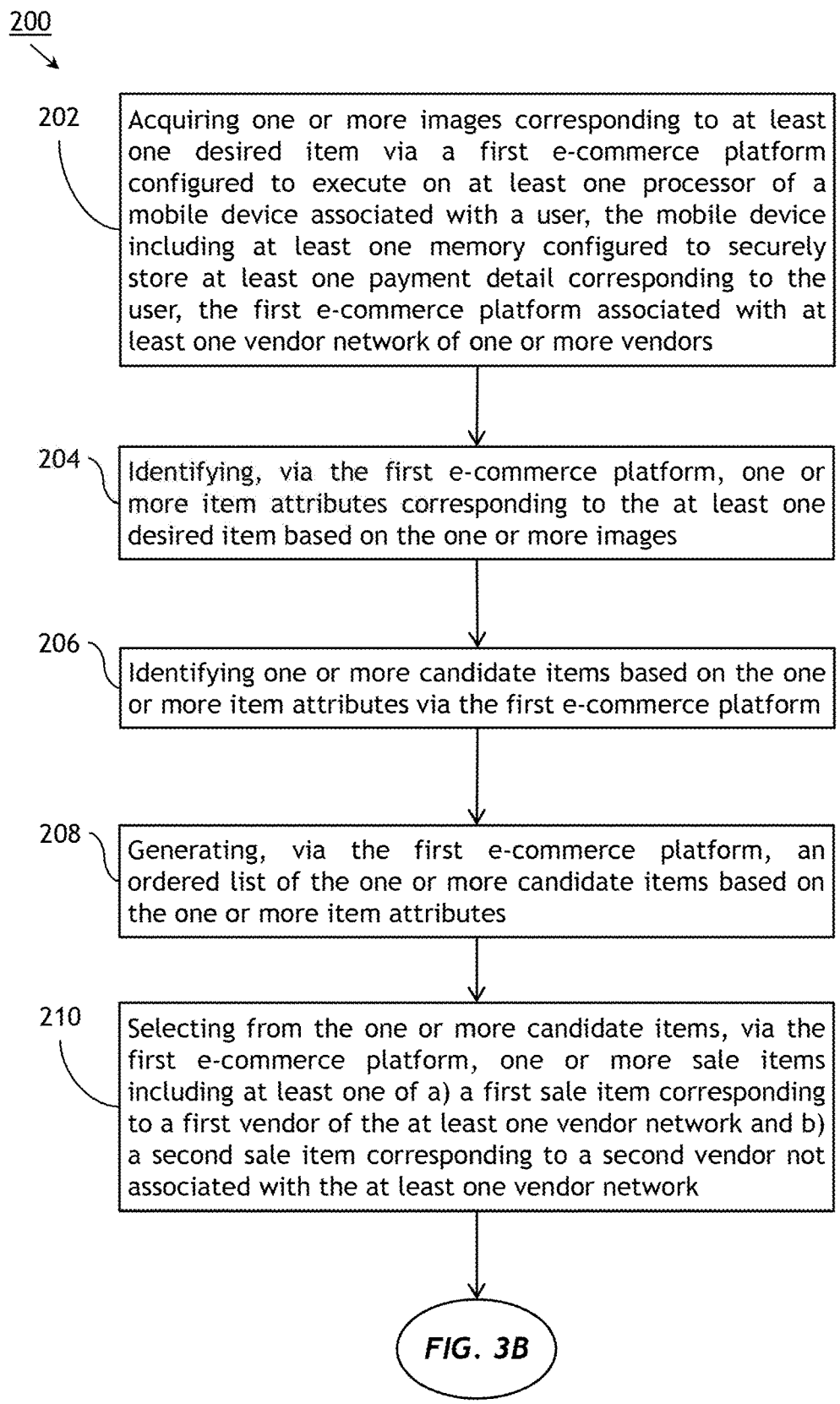
FIGS. 3A-3B are process flow diagrams illustrating a method according to the inventive concepts disclosed herein.
Figure 3B:
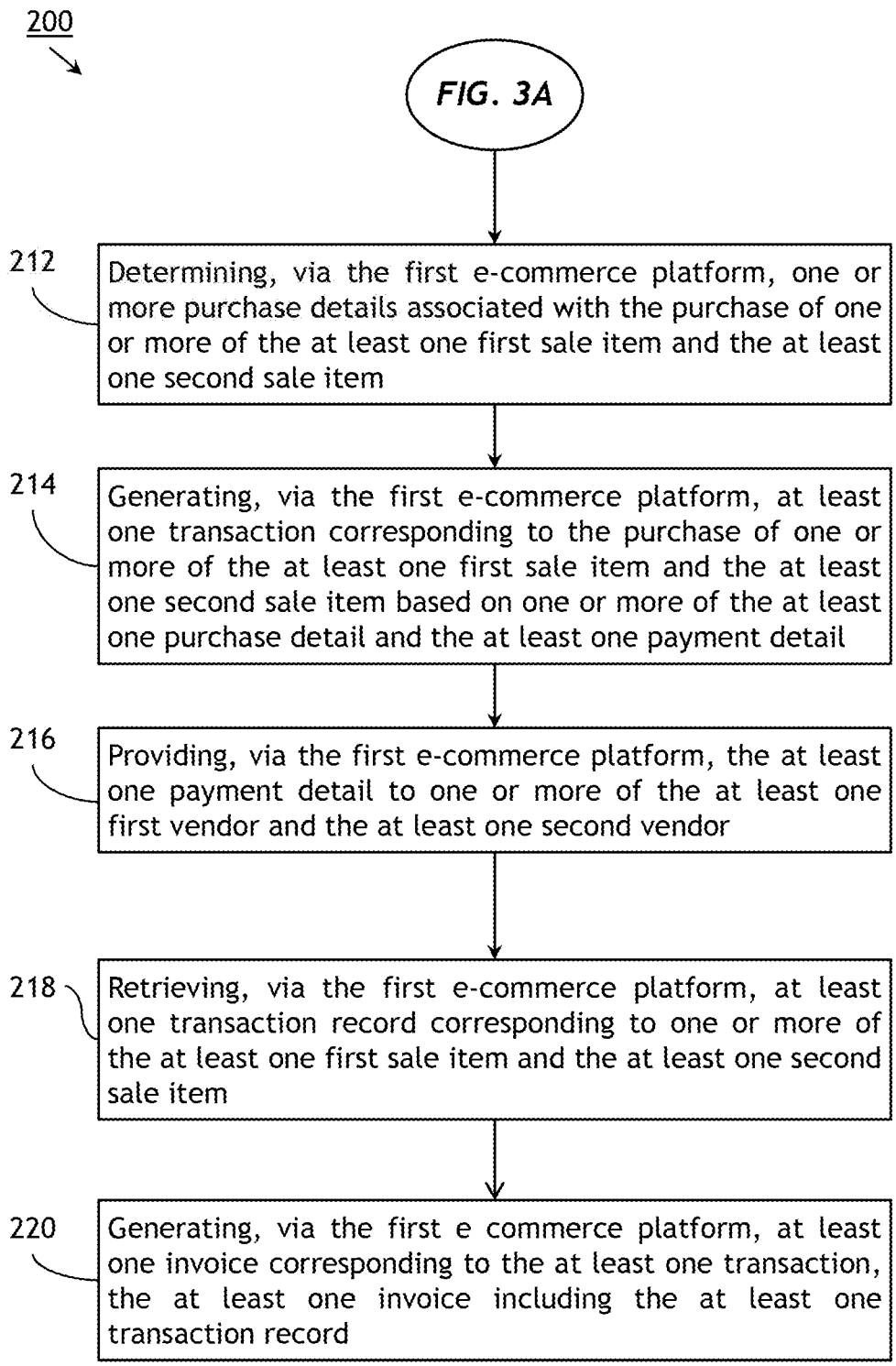

Referring to FIGS. 3A and 3B, an exemplary embodiment of a method 200 for purchasing items identified via image recognition from multiple vendors using a mobile device may include the following steps.

At a step 202, the client-side platform 102 acquires images 138 corresponding to a desired product or item 116 via the mobile device 104 on which the client-side platform executes (via processors of the mobile device). For example, the client-side platform 102 may capture images 138 via an onboard camera 106 of the mobile device 104, or acquire images selected by the end user and stored in the memory 108 of the mobile device. The memory 108 of the mobile device 104 may securely store payment details 112 of the end user, including security details. The client-side platform 102 may be associated with a vendor network 120 of one or more affiliated or in-network vendors 122a-c.

At a step 204, the client-side platform 102 identifies one or more item attributes 140 corresponding to the desired item 116 based on the acquired images 138. For example, the client-side platform 102 may analyze the acquired images 138 to determine textual attributes 140 such as a size, a brand, an item classification, a material, or a color. The client-side platform 102 may analyze the acquired images 138 to identify colors, shades, patterns, and other image attributes 140 corresponding to the acquired images.

At a step 206, the client-side platform 102 identifies candidate items 114 based on the identified attributes 140. At a step 208, the client-side platform 102 generates an ordered list of the candidate items 114 based on the identified attributes 140. For example, the candidate items 114 may be ordered or ranked in order of relevance or similarity to the desired item 116, and displayed on the display screen 124 of the mobile device 104 according to their relevance.

At a step 210, the client-side platform 102 selects one or more candidate items 114 for purchase (118) from an in-network vendor 122a-c of the vendor network 120 or from a third-party vendor 126a-c not affiliated with the vendor network.

Referring to FIG. 3B, at a step 212, the client-side platform 102 determines prices, inventory, shipping, and other purchase details associated with the purchase of selected items 118 from the in-network vendors 122a-c or from the third-party vendors 126a-c. For example, the client-side platform 102 may retrieve purchase information from the in-network vendors 122a-c via APIs 130 of the vendor network 120, and the client-side platform may retrieve purchase information from merchant-side platforms 134a-c of the third-party vendors 126a-c by calling the middleware platforms 132.

At a step 214, the client-side platform 102 generates a transaction corresponding to the purchase of the selected items 118, including the purchase information retrieved from the in-network vendors 122a-c via the network APIs 130 and from the third-party vendors 126a-c via the middleware platforms 132 and the stored payment details 112 of the end user. The transaction may be completed by the end user via an interaction with the mobile device 104, such as a click or tap on the display screen 124 of the mobile device (e.g., a single-click "checkout" button displayed with the transaction details) or a verification of a security detail (such as a password, PIN, or biometric detail) securely stored with the end user's payment details 112 in the memory 108 of the mobile device 104.

At a step 216, the client-side platform 102 provides the necessary payment details 112 of the end user to the appropriate in-network vendors 122a-c and third-party vendors 126a-c so that the completed transaction can be executed on the merchant side. For example, the client-side platform 102 may provide payment details 112 to the in-network vendors 122a-c or vendor network 120 via the network APIs 130, and to the merchant-side platforms 134a-c of the third-party vendors 126a-c via the middleware platform 132.

At a step 218, the client-side platform 102 retrieves authorization codes, purchase confirmations, and other records of the executed transaction from the in-network vendors 122a-c and the third-party vendors 126a-c. For example, the client-side platform 102 may retrieve transaction records from the in-network vendors 122a-c or vendor network 120 via the network APIs 130, and from the merchant-side platforms 134a-c of the third-party vendors 126a-c via the middleware platform 132.

At a step 220, the client-side platform 102 generates an invoice of the executed transaction, including the transaction records retrieved from the in-network vendors 122a-c and the third-party vendors 126a-c.

As will be appreciated from the above, systems and methods according to embodiments of the inventive concepts disclosed herein may enable the online purchase via mobile device of multiple items based on images of the desired items in real time, without disrupting any mobile activity on the part of the end user. The end user need not have prior knowledge of where a desired product or item is sold locally, or even the details of its manufacture. The end user may locate and select items for purchase from both participating/in-network vendors as well as third-party vendors, viewing a single transaction completable by a single click and receiving a single invoice of the transaction regardless of the vendors from which each item is purchased.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. One or more tangible, non-transitory, computer-readable media storing instructions that when executed by one or more processors effectuate operations comprising:
    obtaining, with a computer system, an image from an imaging device or a memory;
    determining, with the computer system, with image recognition, a plurality of attributes of an object depicted in the image;
    determining, with the computer system, based on the plurality of attributes, a first set of candidate items and a second set of candidate items, wherein each of the first set of candidate items is available for purchase from a first vendor and each of the second set of candidate items is available for purchase from a second vendor; and
    causing, with the computer system, a user interface to be presented, the user interface comprising descriptions of the first set of candidate items and descriptions of the second set of candidate items,
    wherein the first vendor is part of a vendor affiliate network including a plurality of vendors,
    wherein the user interface is configured to respond to a user selection of a first item from the first set of candidate items by causing the computer system to interface with an additional computer system of the first vendor via an application program interface (API) request of an API of the vendor affiliate network,
    wherein API of the vendor affiliate network is supported by each of the plurality of vendors;
    wherein the second vendor is not part of the vendor affiliate network;
    wherein the user interface is configured to respond to a user selection of a second item from the second set of candidate items by causing the computer system to interface with an additional computer system of the second vendor via an additional API that is different from the API of the vendor affiliate network;
    wherein the additional API is configured to cause a third-party computer system to place the computer system in communication with the additional computer system of the second vendor to obtain purchase information associated with the second item;
    wherein the API request is configured to cause the computer system to obtain purchase information of the first item from the additional computer system of the first vendor, the purchase information comprising available sizes and colors of the first item; and
    wherein the purchase information of the first item and the purchase information of the second item are presented within the user interface.

2. One or more tangible, non-transitory, computer-readable media storing instructions that when executed by one or more processors effectuate operations comprising:
    obtaining, with a computer system, an image from an imaging device or a memory;
    determining, with the computer system, with image recognition, a plurality of attributes of an object depicted in the image;
    determining, with the computer system, based on the plurality of attributes, a first set of candidate items and a second set of candidate items, wherein each of the first set of candidate items is available for purchase from a first vendor and each of the second set of candidate items is available for purchase from a second vendor; and
    causing, with the computer system, a user interface to be presented, the user interface comprising descriptions of the first set of candidate items and descriptions of the second set of candidate items, wherein:
    each candidate item of the first set of candidate items is selected from a first online catalog of items available for purchase from the first vendor;
    the first online catalog of items comprises an image depicting each item; each image from the first online catalog of items is analyzed to determine attributes of a corresponding item depicted therein;
    a determination is made indicating how closely the plurality of attributes of the object depicted in the image match the attributes of the corresponding item depicted in each image from the first online catalog of items;
    each candidate item of the second set of candidate items is selected from a second online catalog of items available for purchase from the second vendor;
    the second online catalog of items comprises an image depicting each item; each image from the second online catalog of items is analyzed to determine attributes of the corresponding item;
    a determination is made indicating how closely the plurality of attributes of the object depicted in the image match the attributes of the corresponding item depicted in each image from the second online catalog of items;
    the descriptions of the first set of candidate items and the descriptions of the second set of candidate items are presented within the user interface in an order based on the determination indicating how closely the plurality of attributes of the object depicted in the image match the attributes of the corresponding item depicted in each image from the first online catalog of items and how closely the plurality of attributes of the object depicted in the image match the attributes of the corresponding item depicted in each image from the second online catalog of items;

the first online catalog of items is obtained via a first set of application program interface (API) requests;

the first online catalog comprises identifiers of images of items purchasable from the first vendor and submitted via the first set of API requests;

the second online catalog of items is obtained via a second set of application program interface (API) requests;

the second online catalog comprises identifiers of images of items purchasable from the second vendor and submitted via the second set of API requests; and the second online catalog of items differs from the first online catalog of items.

3. The one or more media of claim 1, wherein:

the first set of candidate items is selected from a first online catalog of items available for purchase from the first vendor based on the plurality of attributes;

the second set of candidate items is selected from a second online catalog of items available for purchase from the second vendor based on the plurality of attributes;

the descriptions of the first set of candidate items and the descriptions of the second set of candidate items are presented within the user interface in a ranked order, wherein the ranked order is determined by:

matching the image depicting the object to images associated with each candidate item from the first set of candidate items to determine how closely the plurality of attributes of the object depicted in the image match pluralities of attributes of each item from the first catalog of items depicted in the images, matching the image depicting the object to images associated with each candidate item from the second set of candidate items to determine how closely the plurality of attributes of the object depicted in the image match pluralities of attributes of each item from the second catalog of items depicted in the images, and ranking the images associated with the first set of candidate items and the images associated with the second set of candidate items from most relevant to least relevant based on how closely the plurality of attributes of the plurality of attributes of the object depicted in the image match the pluralities of attributes of each item from the first catalog of items and how closely the plurality of attributes of the object depicted in the image match the pluralities of attributes of each item from the second catalog of items, respectively.

4. The one or more media of claim 1, wherein: the computer system comprises a mobile device;

the image is captured using a camera of the mobile device or is selected by an end user via the mobile device;

determining the plurality of attributes of the object depicted in the image comprises determining the plurality of attributes of the object prior to a search to identify candidate items being performed, the search resulting in the first set of candidate items and the second set of candidate items being determined; and the search includes an indication of the plurality of attributes of the object as a search criterion.

5. The one or more media of claim 1, wherein:

obtaining the image comprises receiving the image from a mobile device at a server; and the descriptions of the first set of candidate items and the descriptions of the second set of candidate items comprise images of candidate items, pricing information, and vendor information, which is sent to the mobile device for presentation within the user interface.

6. The one or more media of claim 1, wherein the image is obtained from a mobile device, the operations further comprise:

determining that an item from the second set of candidate items has been selected for purchase, wherein the first vendor is affiliated with a vendor network hosted by the computer system and the second vendor is unaffiliated with the vendor network;

obtaining pricing and purchasing information associated with the selected item with a workflow selected responsive to the second vendor being unaffiliated with the vendor network;

causing the pricing and purchasing information associated with the item to be provided to the mobile device; and obtaining user information from a user's account of an end user of the mobile device for purchasing the item; and steps for facilitating single-click checkout.

7. The one or more media of claim 1, wherein the operations further comprise:

obtaining, with the computer system, a first online catalog of items associated with the first vendor, the first online catalog of items comprising a first plurality of items and associating respective items from the first plurality of items with respective images of the respective items;

obtaining, with the computer system, a second online catalog of items associated with the second vendor, the second online catalog of items comprising a second plurality of items and associating the respective items from the second plurality of items with respective images of the respective items;

extracting, with the computer system, attributes of each of the first plurality of items in the first online catalog of items and attributes of each of the second plurality of items in the second online catalog of items from the respective images with an image recognition tool implementing one or more visual recognition algorithms, wherein:

determining the first set of candidate items and the second set of candidate items comprises:

determining, based on comparisons of the plurality of attributes of the object depicted in the image and the attributes of each of the first plurality of items in the first online catalog of items and each of the second plurality of items in the second online catalog of items, how closely the object matches items in the first online catalog of items and items in the second online catalog of items, selecting the first set of candidate items from the first online catalog based on how closely the first set of items are determined to match the object, and selecting the second set of candidate items from the second online catalog based on how closely the set of items are determined to match the object, and wherein:

the user interface comprising the descriptions of the first set of candidate items and the descriptions of the second set of candidate items comprises a grid of images, each image in the grid depicts a different item from the first set of candidate items and the second set of candidate items, images in the grid are arranged based on how closely the object matches to the respective item from the first set of candidate items and the second set of candidate items, and the grid provides single-touch access to computer systems of the first vendor, the second vendor, or both the first vendor and the second vendor.

8. The one or more media of claim 1, wherein the operations further comprise:

accounting for first variations in lighting to determine how closely the object depicted in the image matches items in a first online catalog of items associated with the first vendor and how closely the object depicted in the image matches items in a second online catalog of items associated with the second vendor, the accounting for the first variations being performed by a first image recognition tool of a plurality of image recognition tools; and accounting for second variations in visual angle to determine how closely the object depicted in the image matches to items in the first online catalog of items associated with the first vendor and how closely the object depicted in the image matches items in the second online catalog of items associated with the second vendor, the accounting for the second variation being performed by a second image recognition tool of the plurality of image recognition tools, wherein:

the first image recognition tool and the second image recognition tool are the same image recognition tool, or the first image recognition tool differs from the second image recognition tool.

9. The one or more media of claim 1, wherein the operations further comprise:

obtaining, with the computer system, a first online catalog of items associated with the first vendor, the first online catalog of items comprising a first plurality of items and associating respective items with respective images of the respective items;

obtaining, with the computer system, a second online catalog of items associated with the second vendor, the second online catalog of items comprising a second plurality of items and associating the respective items with respective images of the respective items;

extracting first attributes of each of the first plurality of items in the first online catalog of items and second attributes of each of the second plurality of items in the second online catalog of items, the first attributes and the second attributes comprising textual attributes and other attributes, wherein extracting the first attributes and the second attributes comprises one of:

detecting features in images of the first plurality of items and in images of the second plurality of items, the extracted first attributes and the extracted second attributes including color, material, gender, and other item categorizations, or interpolating a shape of a three-dimensional object from a plurality of two-dimensional images, wherein at least one of the first set of candidate items and the second set of candidate items is selected based on the interpolated shape;

eliminating, in a first analysis, items of the first plurality of items from the first online catalog of items having images that do not correspond to the textual attributes; and eliminating, in a second analysis, items of the first plurality of items from the first online catalog of items with image recognition, wherein:

the first set of candidate items comprises the items from the first plurality of items of the first online catalog remaining after the first analysis and the second analysis, and the second analysis is performed after the first analysis on prospective matching items that are not eliminated in the first analysis.

10. The one or more media of claim 1, wherein the operations further comprise:

instantiating a first e-commerce platform, wherein memory of the computer system is configured to securely store at least one payment detail corresponding to an end user of the computer system, wherein the at least one payment detail includes at least one of:

a user identity, an address, an account number, a method of payment, or a security detail, the security detail including at least one of a password, a personal identification number (PIN), or a biometric detail and the first e-commerce platform being associated with a vendor network including the first vendor, and wherein:

the first e-commerce platform being configured to:

determine that at least a first item purchasable from the first vendor and a second item purchasable from the second vendor were selected, wherein the first item was selected from the first set of candidate items and the second item was selected from the second set of candidate items, and wherein the second vendor is external to the vendor network;

determine one or more first purchase details associated with the first item via the API, the API being associated with the first vendor, the vendor network, or the first vendor and the vendor network;

determine one or more second purchase details associated with the second item via a middleware platform invoked by the first e-commerce platform, the middleware platform being configured to connect the first e-commerce platform to a second e-commerce platform associated with the second vendor, wherein the one or more first purchase details and the one or more second purchase details include at least one of: a vendor identity, an availability, a price, a tax, a shipping cost, a color, a size, a dimension, a quantity, or a material associated with at least the first item and the second item;

cause at least one transaction corresponding to a purchase of the first item and the second item to be generated based on at least one of: the one or more first purchase details, the one or more second purchase details, or the at least one payment detail;

provide the at least one payment detail to the first vendor via the API; and retrieve at least one first transaction record corresponding to the purchase via the API, wherein the middleware platform is communicatively coupled to the first e-commerce platform and is configured to:

retrieve the one or more second purchase details from the second e-commerce platform via the additional API;

provide the at least one payment detail to the second e-commerce platform;

retrieve, from the second e-commerce platform, at least one second transaction record corresponding to the purchase; and forward the at least one second transaction record to the first e-commerce platform.

11. The one or more media of claim 10, wherein the computer system is a mobile device, wherein the first e-commerce platform is configured to:
cause the at least one transaction to be generated based on an interaction of the end user with the mobile device, wherein the interaction comprises:
contact of the end user detected by at least one display unit associated with the mobile device;
verification of the at least one payment detail by the mobile device; or
the contact and the verification;
cause at least one invoice associated with the at least one transaction to be generated, the at least one invoice including the at least one first transaction record and the at least one second transaction record, wherein the at least one first transaction record and the at least one second transaction record each include an authorization code, a purchase confirmation, or the authorization code and the purchase confirmation.

12. The one or more media of claim 1, wherein the plurality of attributes comprise a color of the object, a type of the object, and a sub-type of the object, the operations comprise:
generating, from the computer system, a search request for determining the first set of candidate items and the second set of candidate items, wherein:
the search request requests candidate items that are determined to have attributes similar to the plurality of attributes of the object,
the search request causes the first set of candidate items to be selected from a first plurality of items obtained from a first online catalog of items associated with the first vendor via the API, and
the search request causes the second set of candidate items to be selected from a second plurality of items obtained from a second online catalog of items associated with the additional API, the second online catalog of items being different from the first online catalog of items.

13. The one or more media of claim 1, wherein:
the computer system comprises a mobile device;
the image is captured with a camera of the mobile device;
the plurality of attributes comprise a color of the object, a type of the object, and a sub-type of the object;
the object is a shoe; the type is shoe;
the sub-type indicates whether the shoe is a hightop; the plurality of attributes include a material of the shoe; the plurality of attributes include a brand of the shoe;
the first set of candidate items, the second set of candidate items, or both the first set of candidate items and the second set of candidate items include an image of a shoe that matches at least three of the plurality of attributes; and
the first set of candidate items, the second set of candidate items, or both the first set of candidate items and the second set of candidate items includes a shoe that does not match at least one of the plurality of attributes.

14. The one or more media of claim 1, wherein:
the computer system comprises a mobile device;
the first vendor is part of a group of vendors of a remotely hosted vendor network, wherein the remotely hosted vendor network is configured to affiliate a platform executing at least in part on the mobile device with members of the group of vendors; and
the second vendor is not part of the group of vendors in the vendor network; the one or more item attributes include a textual attribute, an image attribute, or the textual attribute and the image attribute;
the textual attribute includes at least one of a size, a color, a material, a quantity, an item description, or a un it of metadata; and
the image attribute includes at least one of a hue, a saturation, a brightness, a shade, or a tint.

15. One or more tangible, non-transitory, computer-readable media storing instructions that when executed by one or more processors effectuate operations comprising:
obtaining, with a computer system, an image from an imaging device or a memory;
determining, with the computer system, with image recognition, a plurality of attributes of an object depicted in the image;
determining, with the computer system, based on the plurality of attributes, a first set of candidate items and a second set of candidate items, wherein each of the first set of candidate items is available for purchase from a first vendor and each of the second set of candidate items is available for purchase from a second vendor; and
causing, with the computer system, a user interface to be presented, the user interface comprising descriptions of the first set of candidate items and descriptions of the second set of candidate items, wherein the operations further comprise:
instantiating a first e-commerce platform, wherein memory of the computer system is configured to securely store at least one payment detail corresponding to an end user of the computer system, the first e-commerce platform being associated with a vendor network including the first vendor, the first e-commerce platform being configured to:
determine that at least a first item purchasable from the first vendor and a second sale item purchasable from a second vendor were selected, wherein the first item was selected from the first set of candidate items and the second item was selected from the second set of candidate items, and wherein the second vendor is external to the vendor network;
invoke a middleware platform configured to connect the first e-commerce platform to a second e-commerce platform associated with the second vendor;
retrieve one or more first purchase details associated with the first item via at least one Application Programming Interface (API), the at least one API being associated with the vendor network, the first vendor, or the first vendor and the vendor network;
retrieve one or more second purchase details associated with the second item via the middleware platform using an additional API that is different from the at least one API associated with the vendor network, the middleware platform being configured to connect the first e-commerce platform to the second e-commerce platform;
cause at least one transaction corresponding to a purchase of the first item and the second item to be generated based on the one or more first purchase details, the one or more second purchase details, and the at least one payment detail;
provide the at least one payment detail to the first vendor via the at least one API;
provide the at least one payment detail to the second vendor via the middleware platform;

retrieve at least one first transaction record corresponding to the purchase via the at least one API;

retrieve at least one second transaction record corresponding to the purchase via the middleware platform using the additional API; and cause at least one invoice associated with the at least one transaction to be generated, the at least one invoice including the at least one first transaction record and the at least one second transaction record.

16. The one or more media of claim 15, wherein:

the at least one payment detail includes at least one of a user identity, an address, an account number, a security detail, or a method of payment; and the at least one security detail includes a value indicative of a fingerprint;

the one or more first purchase details and the one or more second purchase details include at least one of a vendor identity, a quantity, a size, a product code, an item price, a shipping detail, an item availability, and a tax rate;

the one or more second purchase details associated with the second sale item comprises a current pricing information associated with the second sale item, availability information associated with the second sale item, or shipping information associated with the second sale item from the second vendor; and the at least one first transaction record and the at least one second transaction record each include a purchase confirmation, an authorization code, or the purchase confirmation and the authorization code.

17. The one or more media of claim 15, wherein the middleware platform is configured to:

provide purchase information to the first e-commerce platform;

retrieve the at least one payment detail from the first e-commerce platform;

provide the at least one payment detail to the second e-commerce platform to complete a portion of the purchase associated with the second item;

retrieve at least one additional transaction record corresponding to the portion of the purchase from the second e-commerce platform; and provide the at least one additional transaction record to the first e-commerce platform, wherein the at least one invoice further includes the at least one additional transaction record.

18. The one or more media of claim 1, wherein the operations comprise:

receiving a selection of the first item and the second item to be purchased, the first item being from the first set of candidate items and the second item being from the second set of candidate items;

calling the API, wherein:

the API is configured to determine one or more of a price, a quantity, a size, or a description associated with a portion of the purchase associated with the first item, the API, and a middleware platform is configured to determine one or more of a price, a quantity, a size, and a description associated with a portion of the purchase associated with the second item from the second vendor, wherein the second vendor is unassociated with the vendor network.

19. A method implemented by a computer system configured to execute one or more computer program instructions, the method comprising:

obtaining, with the computer system, an image;

determining, with the computer system, with image recognition, a plurality of attributes of an object depicted in the image;

determining, with the computer system, based on the plurality of attributes, a first set of candidate items and a second set of candidate items, wherein each of the first set of candidate items is available for purchase from a first vendor and each of the second set of candidate items is available for purchase from a second vendor; and causing, with the computer system, a user interface to be presented, the user interface comprising descriptions of the first set of candidate items and descriptions of the second set of candidate items, wherein the first vendor is part of a vendor affiliate network including a plurality of vendors, wherein the user interface is configured to respond to a user selection of a first item from the first set of candidate items by causing the computer system to interface with an additional computer system of the first vendor via an application program interface (API) request of an API of the vendor affiliate network, wherein API of the vendor affiliate network is supported by each of the plurality of vendors;

wherein the second vendor is not part of the vendor network;

wherein the user interface is configured to respond to a user selection of a second item from the second set of candidate items by causing the computer system to interface with an additional computer system of the second vendor via an additional API that is different from the API of the vendor affiliate network;

wherein the additional API is configured to cause a third-party computer system to place the computer system in communication with the additional computer system of the second vendor to obtain purchase information associated with the second item;

wherein the API request is configured to cause the computer system to obtain purchase information of the first item from the additional computer system of the first vendor, the purchase information comprising available sizes and colors of the first item; and wherein the purchase information of the first item and the purchase information of the second item are presented within the user interface.

* * * * *